No. 847,231. PATENTED MAR. 12, 1907.
A. F. BRYCE.
PNEUMATIC TIRE.
APPLICATION FILED JAN. 30, 1906.
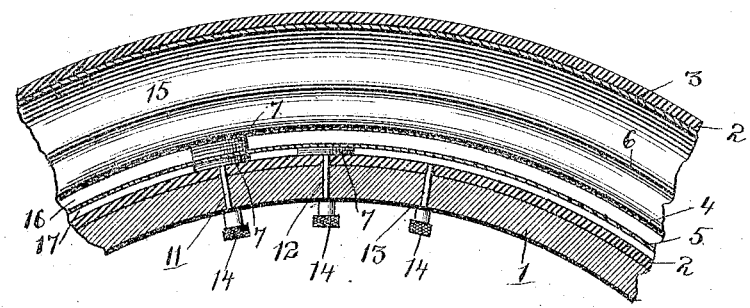
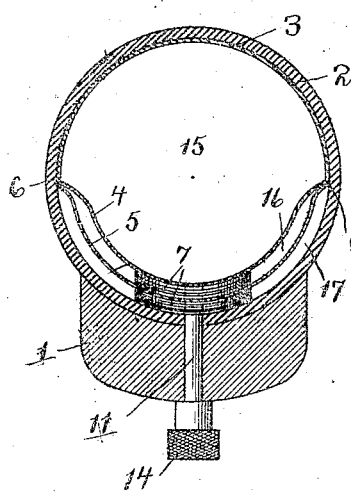
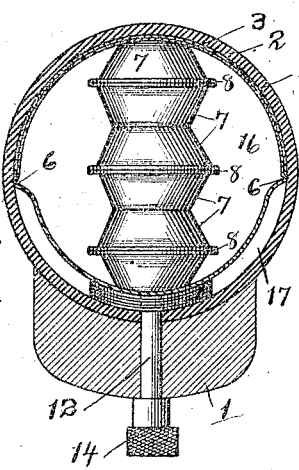
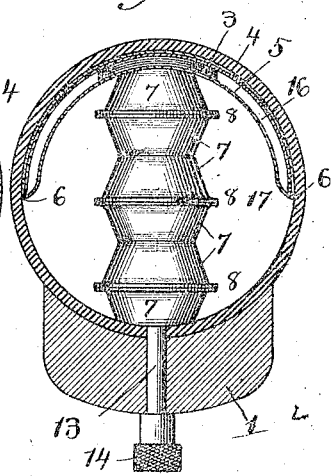
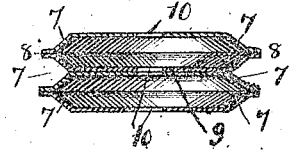
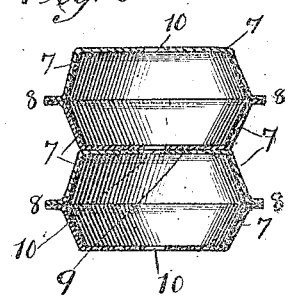
Witnesses.
Wm. P. Bond
Inventor.
Alexander F. Bryce
By Banning & Banning
Attorneys.

UNITED STATES PATENT OFFICE.

ALEXANDER F. BRYCE, OF CHICAGO, ILLINOIS.

PNEUMATIC TIRE.

No. 847,231.  Specification of Letters Patent.  Patented March 12, 1907.

Application filed January 30, 1906. Serial No. 298,624.

*To all whom it may concern:*

Be it known that I, ALEXANDER F. BRYCE, a citizen of the United States, residing at Chicago, in the county of Cook and State of Illinois, have invented a certain new and useful Improvement in Pneumatic Tires, of which the following is a specification.

This invention relates to pneumatic tires for the wheels of vehicles of different types, and has for its objects to construct a pneumatic tire with compartments separate and distinct one from the other and each of which can be brought into condition to serve as the receiver for air under pressure to maintain the tire in its expanded form; to enable each compartment of the pneumatic tire to be filled independently with air under pressure and serve as the retaining means for the air, thus enabling each compartment to be utilized in maintaining the tire under expansion; to furnish a pneumatic tire with compartments, each compartment adapted to retain air under pressure, so that in case of rupture of the wall of one compartment another compartment can be utilized to maintain the tire in operative shape; to give each compartment a separate inlet for pressure, by which each inlet can be utilized in supplying air under pressure to the compartment; to connect each compartment of the tire with a supply-valve by a collapsible connection having the property of expansion when a compartment has its wall expanded; to construct an expansible and contractible connection leading from the compartment of the tire to the supply-tube for air under pressure; to connect the compartments of a pneumatic tire with the supply-tube for air under pressure by a conduit constructed with bellows folds for expansion and contraction, and to improve generally the several elements entering into the formation of the tire as a whole.

In the drawings, Figure 1 is a detail in sectional elevation of the pneumatic tire of the invention; Fig. 2, a cross-section showing the innermost compartment with its wall expanded to furnish the cushion; Fig. 3, a cross-section showing the innermost and intermediate wall expanded for the intermediate wall to furnish the cushion; Fig. 4, a cross-section showing the walls of all the compartments expanded for the outermost wall to furnish the cushion; Fig. 5, a detail in section showing the collapsible and expansible conduit partially closed, and Fig. 6 a detail in section showing the expansible and collapsible conduit in an expanded condition.

A complete wheel is not shown; but it is to be understood that the wheel is to be constructed in any usual and well-known manner with a hub and spokes and a supporting circumferential rim 1, of wood, metal, or other suitable material. The rim 1 receives and supports the pneumatic tire 2, formed of rubber and of any usual and well-known form of construction for pneumatic tires. The interior chamber or space of the tube 2 has located therein in the form shown three diaphragms or partitions 3, 4, and 5, each of which is attached at the side edges to the inner face of the wall of the tire or tube 2, as at the point 6 or otherwise, so as to have each diaphragm or partition form a wall which can be expanded to closely hug or impinge the inner face of the tube or tire 2 or the face of the adjoining diaphragm or partition.

The diaphragms or partitions 3, 4, and 5 are made of rubber or other material capable of being expanded under pressure, so that each diaphragm or partition becomes the wall of an inclosing chamber or compartment for receiving pressure.

The diaphragm or partition 4 and the outer diaphragm or partition 5 each has a collapsible and expansible conduit for admitting air under pressure to the compartments or chambers formed between the diaphragms or partitions 3 and 4 and the diaphragms or partitions 4 and 5. The conduit is preferably formed as shown in Figs. 5 and 6, and each conduit consists of disks 7, of rubber or other expansible material joined at their periphery so as to be air-tight and leave an edge 8, and the faces of the two adjoining disks or walls 7 are tightly cemented one to the other at their center 9, and through the center of the several disks or walls is a hole or perforation 10, furnishing a passage for air under pressure. The conduit for the diaphragm or partition 4 has its center attached to the face of the diaphragm or partition 4 and to the face of the diaphragm or partition 5 on each side and to the face of the external tire or tube 2, and in the diaphragms 4 and 5 and the external tire or tube 2 is a hole or perforation in line with the hole or perforation 10 in the disks or walls 7 of the conduit. The conduit for the diaphragm 5 is attached at its center to the face of the diaphragm and to the face of the outer tire or tube 2, and the diaphragm and the outer tire or tube each have a hole or perforation in line with the hole or perforation 10 in the disks or walls 7 of the conduit. The conduit for the diaphragm or partition 4 is in two divisions, while the conduit for the diaphragm or partition 5 is in one division, and, as shown, each division for the respective conduits is formed of six disks or walls; but it will be understood that where more compartments for receiving pressure are desired conduits of three, four, or more divisions will be required, such conduits having the construction of the single-division conduit shown in Figs. 5 and 6. The conduit for the diaphragm or partition 4 is in communication with a supply-tube 11 for air under pressure, and the conduit for the diaphragm or partition 5 is in communication with a supply-tube 12 for air under pressure. The compartment between the diaphragm or partition 5 and the exterior tire or tube 2 is in communication with a tube 13 for air under pressure. The tubes 11, 12, and 13 can be of any usual and well-known form of construction for tubes of pneumatic tires, and each tube is closed by a cap 14, as usual.

The diaphragm or partition 3 and the diaphragm or partition 4 furnish between them a compartment or chamber 15 for receiving air under pressure. The diaphragm or partition 4 and the diaphragm or partition 5 form between them a compartment or chamber 16 for receiving air under pressure. The diaphragm 5 and the exterior tire or tube 2 form between them a compartment or chamber 17 for receiving air under pressure.

Air under pressure is supplied to the compartment or chamber 15 from the tube 11 through the expansible and collapsible conduit between the diaphragms or partitions 4 and 5 and the diaphragm or partition 5 and the exterior tube or tire 2, and the air acts to expand the diaphragm or partition 3 for such diaphragm or partition to closely hug or impinge against the inner face of the exterior tire or tube and for the diaphragms or partitions 4 and 5 to contact each other with the diaphragm or partition 5 in contact with the inner face of the exterior tire or tube, as shown in Fig. 2, except that in Fig. 2 the diaphragms 4 and 5 are separated somewhat from their natural condition in order to show the compartments 16 and 17 more clearly, it being understood that when air under pressure is admitted into the compartment or chamber 15 the diaphragms 3, 4, and 5 will be forced outward and not separated for the diaphragms or partitions 4 and 5, as shown in Fig. 2.

Air under pressure is admitted to the compartment or chamber 16 through the expansible and contractible conduit for the diaphragm 5 from the tube 12 for the air under pressure to expand the diaphragms 4 and 5 and have the diaphragms hug or closely impinge against the diaphragm or partition 3 and the exterior tire or tube 2, as shown in Fig. 3, except that in Fig. 3 the diaphragm or partition 5 is not shown closed down, but is left separated from the tube or tire 2 in order to more clearly show the compartment or chamber 17 between the diaphragm and the tire or tube. It will thus be seen that when the diaphragm or partition 4 is expanded, as shown in Fig. 3, the division of the conduit between the diaphragms or partitions 4 and 5 is expanded, so that it is in the condition shown in Fig. 3, while the division of the conduit between the diaphragm or partition 5 and the exterior tire or tube is collapsed. The conduit between the diaphragms or partitions 4 and 5 expands with the expansion of the diaphragm or partition 4 and remains unbroken, so that no leakage of air under pressure can escape from the chamber 16 when said compartment or chamber contains the air-cushion, and when expanded, as shown in Fig. 3, the diaphragm or partition 4 and the diaphragm or partition 5, in connection with the exterior tire or tube, forms a complete pneumatic tube.

Air under pressure is supplied from the tube 13 to the compartment or chamber 17, and the air so supplied will expand the diaphragm or partition 5 into the condition shown in Fig. 4, except that the diaphragms 3, 4, and 5 should be in contact with each other instead of having the diaphragm 5 separated, as in Fig. 4, such separation being for the purpose of more clearly showing the space forming the compartment or chamber 16 when the diaphragms are all expanded or forced outward. The conduit between the diaphragms 4 and 5 will be collapsed or folded together when the diaphragm 5 forms the wall of the air-compartment or chamber, as shown in Fig. 4, and the conduit between the diaphragm 5 and the external tire or tube will be expanded, as shown in Fig. 4, such expansion maintaining a connection between the diaphragm or partition 5 and the exterior tire or tube, by which the air under pressure will be held in the compartment or chamber 17 and form the air-cushion.

The tire of the present invention furnishes three distinct and separate compartments or chambers for air under pressure, each of which when in use will constitute an air-cushion. It will thus be seen that in case of a rupture of the exterior tire or tube and the diaphragm or partition 3 the diaphragm or partition 4 can be expanded and furnish a closed compartment or chamber for the air under pressure, maintaining the tire in operative condition and against collapsing, and in case the diaphragm or partition 4 is ruptured or rendered inoperative from any cause the diaphragm or partition 5 can be expanded and furnish a compartment or chamber 17 for air under pressure to serve as an air-cushion. The compartments or chambers are distinct one from the other, and each can be made to serve as a receiver for air under pressure. The expansible and contractible conduit for the diaphragms 4 and 5 enables each diaphragm to be independently expanded, and when expanded no leakage will occur around the conduit, and each conduit will assume the proper position and condition for admitting air under pressure to the several chambers and hold such air against leakage, thus maintaining the seal of each compartment or chamber as a receiver of air under pressure to hold the tire as a whole in its expanded condition. The expansible and contractible conduit will give and take, according to the position of the diaphragm or partition to which it is attached, and thus maintain a sealed attachment for the conduit with its diaphragm, which seal remains unbroken no matter whether the conduit is folded or expanded. The conduit furnishes a connection for supplying air to the several compartments or chambers, and as the conduit is free to fold and expand with the movement of the diaphragm or partition it will be seen that the conduit will remain intact and firmly and securely attached in place irrespective of the position of the diaphragm or partition, thus insuring a perfect and reliable means for supplying air under pressure to the several compartments of the tire as a whole.

It will be understood that the diaphragms or partitions forming separate compartments or chambers for receiving pressure, in connection with a conduit capable of expanding and contracting, can be utilized in pneumatic tires having a tube within the outer tube, as in the construction of some forms of pneumatic tires. It will also be understood that the collapsible and expansible conduit need not necessarily be bellows-folding, but should be of some flexible material that can be folded or expanded without destroying the unity and integrity of the connection between the conduit and the diaphragms.

What I claim as new, and desire to secure by Letters Patent, is—

1. In a pneumatic tire, the combination of an outer tube, a plurality of diaphragms dividing the interior of the tube into a plurality of compartments for containing pressure, and a collapsible and expansible conduit admitting pressure to a compartment and expanding the diaphragm, substantially as described.

2. In a pneumatic tire, the combination of an outer tube, a plurality of diaphragms dividing the interior of the tube into a plurality of compartments for containing pressure, and a plurality of collapsible and expansible conduits, each conduit having a hole for admitting pressure to a compartment and expanding the diaphragm, substantially as described.

3. In a pneumatic tire, the combination of an outer tube, a plurality of diaphragms dividing the interior of the tube into a plurality of compartments for containing pressure, a plurality of collapsible and expansible conduits, each conduit having a hole for admitting pressure to a compartment and expanding the diaphragm, and a pressure-supply tube for each conduit and diaphragm, substantially as described.

4. In a pneumatic tire, the combination of an outer tube, a plurality of diaphragms dividing the interior of the tube into a plurality of compartments for containing pressure, and a conduit bellows-foldable for admitting pressure to a compartment and expanding the diaphragm, substantially as described.

5. In a pneumatic tire, the combination of an outer tube, a plurality of diaphragms dividing the interior of the tube into a plurality of compartments for containing pressure, and a plurality of conduits bellows-foldable, each conduit having a hole for admitting pressure to a compartment and expanding the diaphragm, substantially as described.

6. In a pneumatic tire, the combination of an outer tube, a plurality of diaphragms dividing the interior of the tube into a plurality of compartments for containing pressure, a plurality of conduits bellows-foldable, each conduit having a hole for admitting pressure to a compartment and expanding the diaphragm, and a pressure-supply tube for each conduit and diaphragm, substantially as described.

7. In a pneumatic tire, the combination of an outer tube, a plurality of diaphragms dividing the interior of the tube into a plurality of compartments for containing pressure, a plurality of conduits bellows-foldable for admitting pressure to a compartment and expanding the diaphragms of the compartment, and means for supplying pressure to each conduit and diaphragm independently, substantially as described.

ALEXANDER F. BRYCE.

Witnesses:
OSCAR W. BOND,
WALKER BANNING.